US012694091B2

(12) United States Patent
Bisa et al.

(10) Patent No.: US 12,694,091 B2
(45) Date of Patent: Jul. 28, 2026

(54) SYSTEMS AND METHODS FOR COLLECTIVE ATTESTATION OF SPDM-ENABLED DEVICES IN AN INFORMATION HANDLING SYSTEM (IHS)

(71) Applicant: Dell Products, L.P., Round Rock, TX (US)

(72) Inventors: Rama Rao Bisa, Bangalore (IN); Dharma Bhushan Ramaiah, Bangalore (IN); Vineeth Radhakrishnan, Palakkad (IN); Mini Thottunkal Thankappan, Bangalore (IN); Shinose Abdul Rahiman, Bangalore (IN); Chandrashekar Nelogal, Round Rock, TX (US); Mukund P. Khatri, Austin, TX (US); A Anis Ahmed, Bangalore (IN); Marshal F. Savage, Austin, TX (US); Jason Matthew Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 643 days.

(21) Appl. No.: 18/177,901

(22) Filed: Mar. 3, 2023

(65) Prior Publication Data

US 2024/0296235 A1     Sep. 5, 2024

(51) Int. Cl.
| | |
|---|---|
| *G06F 21/44* | (2013.01) |
| *G06F 21/57* | (2013.01) |
| *G06F 21/60* | (2013.01) |
| G06F 21/55 | (2013.01) |

(52) U.S. Cl.
CPC ............ *G06F 21/44* (2013.01); *G06F 21/572* (2013.01); *G06F 21/602* (2013.01); *G06F 21/554* (2013.01)

(58) Field of Classification Search
CPC ........ G06F 21/602; G06F 21/30; G06F 21/44; G06F 21/57; G06F 21/572; G06F 2212/1052; G06F 21/445
See application file for complete search history.

(56) References Cited

U.S. PATENT DOCUMENTS

| | | | | |
|---|---|---|---|---|
| 11,265,721 | B1* | 3/2022 | Satpathy | ................ G02B 30/22 |
| 2019/0230002 | A1* | 7/2019 | Bernat | ................ H04L 63/0823 |
| 2022/0067165 | A1* | 3/2022 | Huang | ................ G06F 11/3024 |
| 2022/0179806 | A1* | 6/2022 | Hilland | .................... G06F 13/20 |
| 2023/0118344 | A1* | 4/2023 | Bower, III | ........... G06F 9/4401 |
| | | | | 713/175 |
| 2023/0216849 | A1* | 7/2023 | Smith | ...................... H04L 63/20 |
| | | | | 726/7 |
| 2023/0254111 | A1* | 8/2023 | Olsen | ...................... H04L 9/006 |
| | | | | 713/150 |
| 2025/0233757 | A1* | 7/2025 | Fromentoux | ......... H04L 9/3263 |

* cited by examiner

*Primary Examiner* — Benjamin E Lanier
*Assistant Examiner* — Brandon Binczak
(74) *Attorney, Agent, or Firm* — Fogarty LLP

(57) ABSTRACT

According to embodiments of the present disclosure, an Information Handling System (IHS) including multiple Security Protocol and Data Model (SPDM)-enabled devices is configured to perform collective attestation. The collective attestation is provided by computer-executable instructions that, when executed by a processor of the IHS, receive an attestation request from a requesting device and a device identity certificate from each of the devices. Using the device identity certificates, the instructions perform a cryptographic hash over the received device identity certificates, and send the cryptographic hash to the requesting device in response to the request.

17 Claims, 4 Drawing Sheets

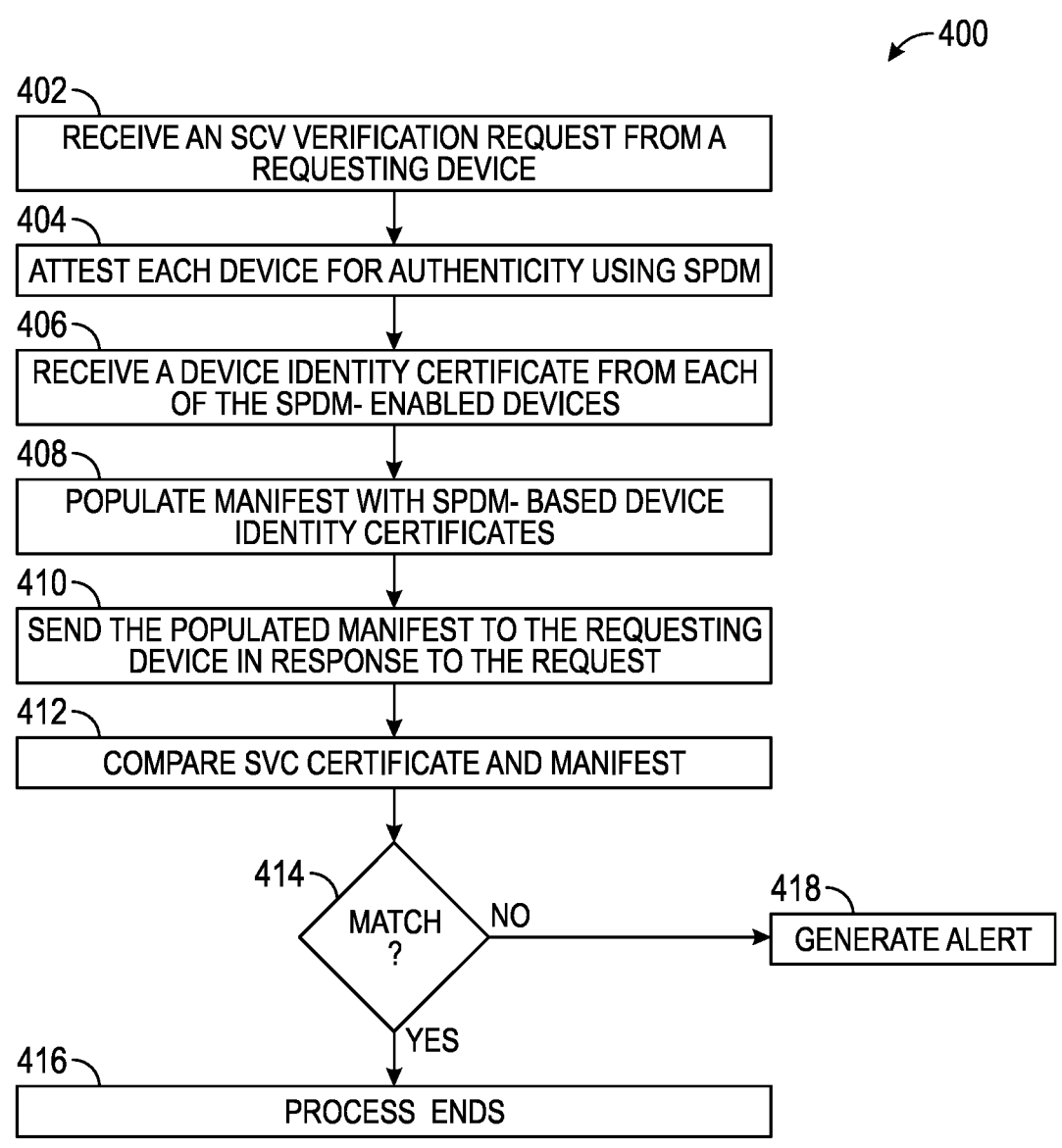

404

400

402
RECEIVE AN SCV VERIFICATION REQUEST FROM A
REQUESTING DEVICE

404
ATTEST EACH DEVICE FOR AUTHENTICITY USING SPDM

406
RECEIVE A DEVICE IDENTITY CERTIFICATE FROM EACH
OF THE SPDM- ENABLED DEVICES

408
POPULATE MANIFEST WITH SPDM- BASED DEVICE
IDENTITY CERTIFICATES

410
SEND THE POPULATED MANIFEST TO THE REQUESTING
DEVICE IN RESPONSE TO THE REQUEST

412
COMPARE SVC CERTIFICATE AND MANIFEST

414
MATCH
?

NO

418
GENERATE ALERT

YES

416
PROCESS ENDS

FIG. 4

SYSTEMS AND METHODS FOR COLLECTIVE ATTESTATION OF SPDM-ENABLED DEVICES IN AN INFORMATION HANDLING SYSTEM (IHS)

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of security provided thereby.

SUMMARY

According to embodiments of the present disclosure, an Information Handling System (IHS) including multiple Security Protocol and Data Model (SPDM)-enabled devices is configured to perform collective attestation. The collective attestation is provided by computer-executable instructions that, when executed by a processor of the IHS, receive an attestation request from a requesting device and a device identity certificate from each of the devices. Using the device identity certificates, the instructions perform a cryptographic hash over the received device identity certificates, and send the cryptographic hash to the requesting device in response to the request.

According to another embodiment, a collective attestation method includes the steps of receiving an attestation request from a requesting device, and receiving a device identity certificate from each of a plurality of Security Protocol and Data Model (SPDM)-enabled devices conforming to a SPDM specification. The method further includes the steps of performing a cryptographic hash over the received device identity certificates, and sending the cryptographic hash to the requesting device in response to the request.

According to yet another embodiment, a computer program product is configured with computer-executable instructions that, upon execution by an Information Handling System (IHS), cause the IHS to receive an attestation request from a requesting device, receive a device identity certificate from each of a plurality of SPDM-enabled devices conforming to a SPDM specification, perform a cryptographic hash over the received device identity certificates, and send the cryptographic hash to the requesting device in response to the request.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 illustrates an example Secure Component Verification (SCV) verification method that may be performed to perform an SCV verification in which the SCV certificate is populated with SPDM certificates according to one embodiment of the present disclosure.

DETAILED DESCRIPTION

Figure 1:
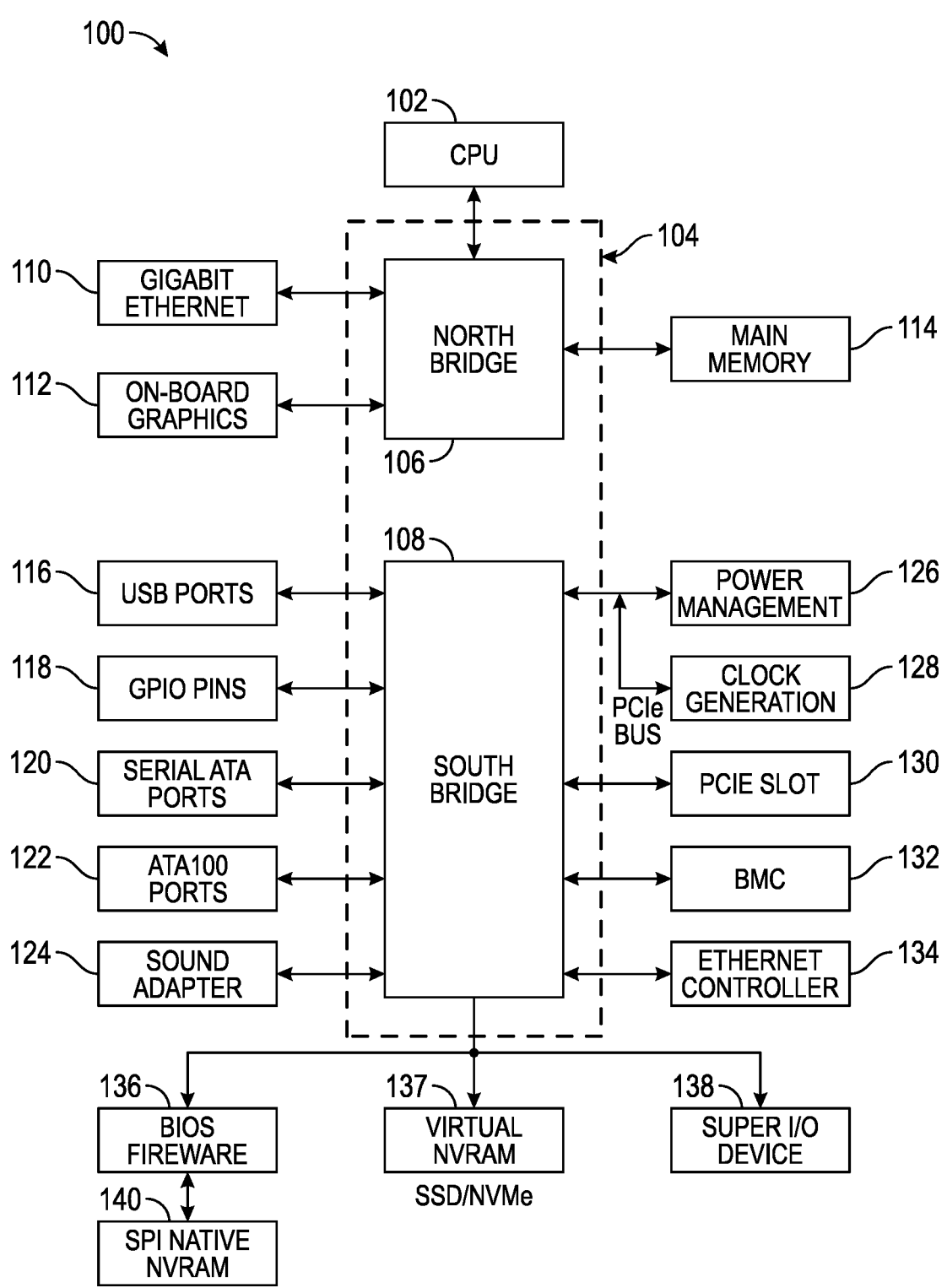
FIG. 1 shows an example of an Information Handling System (IHS) that may be configured to implement a system and method for collective attestation according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard management controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

BMCs are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

IHSs, such as servers used in an Information Technology (IT) data center domain, may each be configured with numerous devices (e.g., Network Interface Cards (NICs), Input/Output devices, etc.). Each device may be configured with its own unique hardware device identity and firmware version. SPDM provides a way to attest each device in the server. When an external entity (e.g., console) attests the server, the BMC may be required to provide each component's hardware identity and firmware measurements. The user of the console, however, may not be interested in each component's security, instead they may just want to know if the devices in server are not compromised. That is, they may just be interested in the overall security posture of the server.

An additional drawback associated with performing attestation for each device in the server is that sharing information about each device's details to the external world can also lead to a potential vulnerability. For example, once an intruder knows the arrangement and/or configuration of devices in the server, hacking into the server becomes easier. Additionally, vendors (e.g., manufacturers, systems integrators, Value Added Resellers (VARs), etc.) who may have invested substantial development costs in deriving an optimal server configuration may not want to expose that server's configuration details to outside world.

Today servers are often shipped from the factory based on the requirements from the customer who has the ability to verify the identity of the devices by fetching the Device Identity Certificate using Secure Component Verification (SCV). Drift detection may be required for both the hardware configuration and the firmware versions of devices configured in the server. The server configuration as it was tested and proven should be maintained from drift (e.g., changes to physical configuration and firmware version) to ensure security of the system. That is, a known, tested and qualified configuration should be used to ensure secure operations.

Several reasons exist why drift is not desirable. For example, when a customer purchases a server for a specific use case or configures the servers with a specific hardware and firmware configuration, changes to that configuration may adversely affect how the server is able perform that specific use case. Moreover, once the configuration is approved, any changes into that may indicate compromise and reduced security. This may lead to undue operational cost to the customer. Even with the System Lockdown feature, a vulnerability in BMC firmware can be exploited by an attacker and can make changes into the BMC configuration and server hardware configurations.

Secure Component Verification (SCV) includes information about the server assembly, and may include identity information about the individual devices (e.g., storage controller, NIC etc.) in the server. These device identities are not cryptographically bound to the hardware component. SPDM, however, provides a mechanism to identify the hardware component with a cryptographic identity. SCV certificates contain identities of individual components which are not cryptographically bound to the hardware. If a hardware component is replaced by a counterfeit component, SCV verification is not able to identify the counterfeit component, a condition that may expose vulnerabilities.

As will be described in detail herein below, embodiments of the present disclosure provide a system and method for collective attestation of the SPDM-enabled devices in an IHS. In one embodiment, the collective attestation uses SPDM-based device identity certificates and/or firmware measurements to perform a cryptographic hash over the plurality of device identity certificates and/or firmware measurements, and send the cryptographic hash to the requesting device in response to the request. In this manner, the requester (e.g., console) may have a high level of confidence that the server is in a secure state without requiring device attestation for each device in the server. In another embodiment, the collective attestation system populates SCV certificates with SPDM-based certificates to provide a mechanism to identify the hardware component with a cryptographic identity tied to its associated hardware as will be described in detail herein below.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
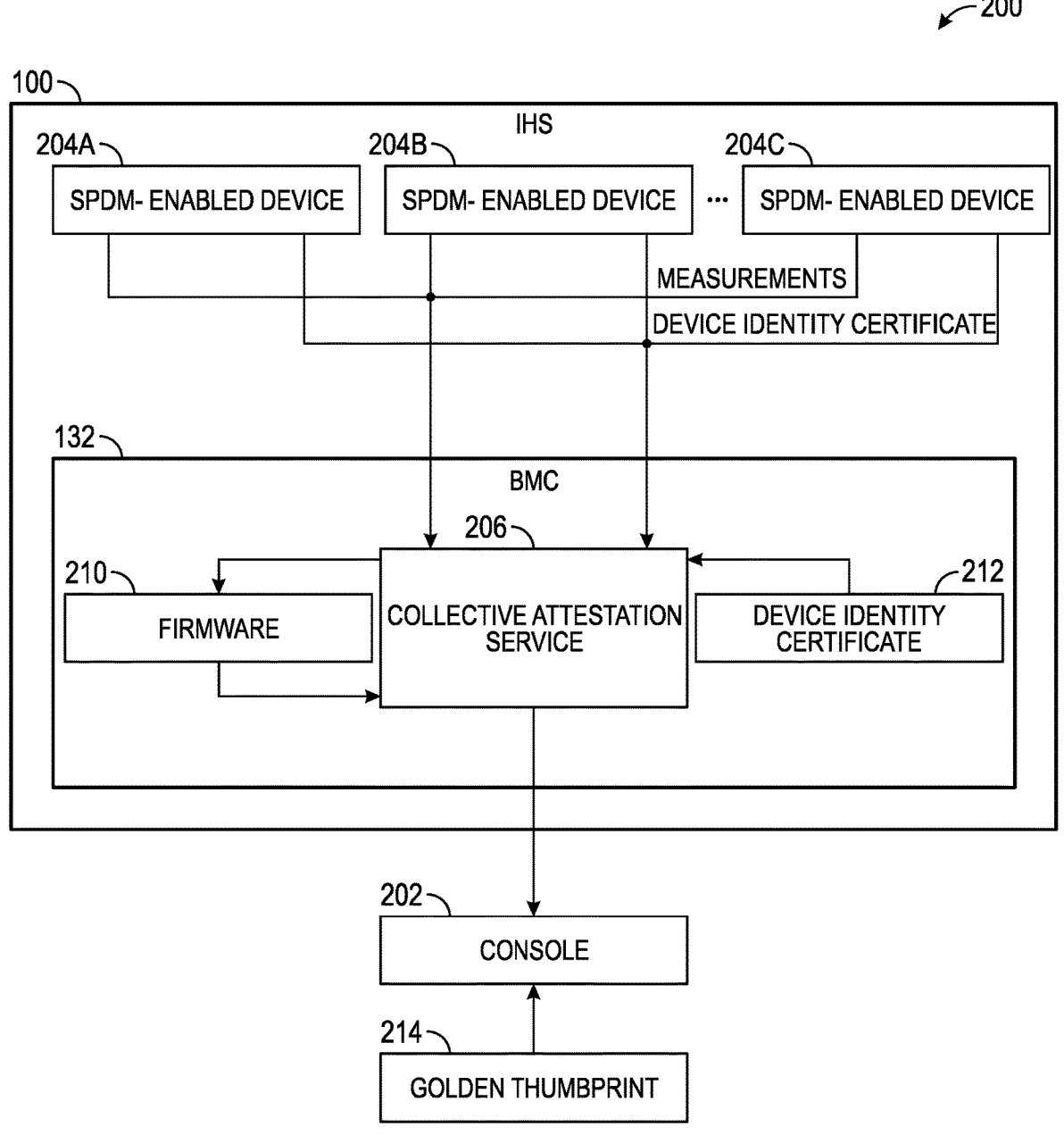
FIG. 2 illustrates an example collective attestation system according to one embodiment of the present disclosure.

FIG. 2 illustrates an example collective attestation system 200 according to one embodiment of the present disclosure. The collective attestation system 200 includes an IHS 100 in communication with a console 202, such as one that manages the operation of the IHS 100. For example, console 202 may include a systems management appliance such as the Dell EMC OpenManage Enterprise (OME) systems manager that is installed on a secure virtual machine (VM), such as a VMWARE Workstation. Additionally, the console 202 may be configured locally to the IHS 100 (e.g., in the same data center), or remotely over communication network, such as the Internet.

The IHS 100 includes a BMC 132 that functions as an interface to monitor and control the operation of one or more SPDM-enabled devices 204*a-n* (collectively 204) configured in the IHS 100. Examples of SPDM-enabled devices 204*a-n* may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above.

According to embodiments of the present disclosure, the BMC 132 stores and executes a collective attestation service 206 that, upon a request from the console 202, receives a device identity certificate 212 and/or a firmware measurement from each of the devices, performs a cryptographic hash over the plurality of device identity certificates, and sends the cryptographic hash to the requesting device in response to the request, which in this particular embodiment, is the console 202. Although the present embodiment describes the BMC 132 as executing the collective attestation system 206, it should be appreciated that the features provided by the collective attestation system 206 may be performed by any suitable device configured in the IHS 100. For example, the features provided by the collective attestation service 206, such as described herein, may be performed by one of the SPDM-enabled devices 204, or by a device external to the IHS 100.

In one embodiment, the collective attestation system 206 may perform a measurement of the firmware 210 running on the BMC 132 and generate the cryptographic hash using the cryptographic hash of the SPDM-enabled devices 204 along with the BMC's firmware measurement. In another embodiment, the collective attestation system 206 may obtain a device identity certificate 212 of the BMC 132, and add it to the cryptographic hash to generate a single measurement for the entire IHS 100. This single measurement indicates the hardware identities and firmware measurements of the entire configuration of the IHS 100. The console 202, or other external entity, may use this collective measurement to compare with a golden thumbprint (e.g., Reference Integrity Measurement (RIM)) to determine whether drift in the IHS's configuration has changed to take further action.

The golden thumbprint 214 generally refers to a reference certificate that is generated based upon a known good configuration of the devices and firmware of the IHS 100. In general, the golden thumbprint 214 may be generated when the IHS 100 is manufactured, or whenever changes, such as the addition or removal of devices 204, or whenever firmware or software on one or more of the devices 204 is performed. In one embodiment, the golden thumbprint 214 may be stored in an online support portal of the vendor, VAR, or intermediary supplier so that it may be provided to the console 202 over a publicly available network, such as the Internet.

In one embodiment, the golden thumbprint 214 may comprise a SCV certificate including SPDM-based certificates of all SPDM-enabled devices 204 in the IHS 100. Additional details of the golden thumbprint 214 functioning as a SCV certificate will be described in detail herein below.

According to embodiments of the present disclosure, the collective attestation system 200 identifies drift using the SPDM Device identify certificate and SPDM firmware measurements. SPDM-enabled devices 204 each have an identity certificate at slot 0, which along with the SPDM firmware measurements may be used to identify drift. Once the configuration is approved or finalized, the BMC 132 may attest the devices, fetch the device identity certificates 212 and device measurements. All the SPDM device measurements and the SPDM Identity certificates are hashed together to create a golden thumbprint 214 as described above. Additionally, the golden thumbprint 214 is signed with the BMC's device identity certificate 212 and stored in persistent memory. The golden thumbprint 214 shall be re-created based on a trigger from the customer/administrator when any configuration is going to be updated to the approved configuration.

Figure 3:
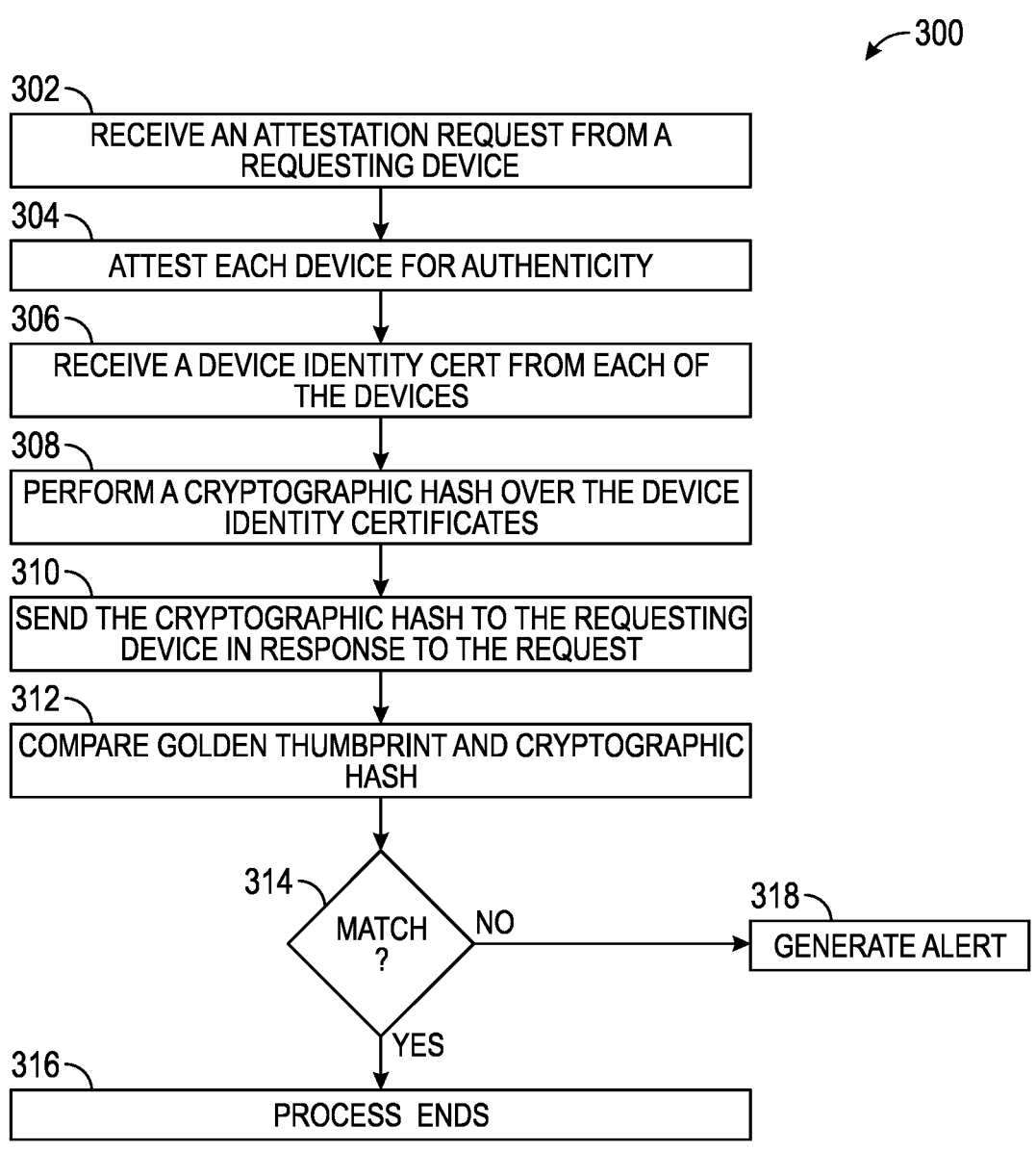
FIG. 3 illustrates an example collective attestation method that may be performed to collectively attest some, most, or all of the SPDM-enabled devices configured in an IHS according to one embodiment of the present disclosure.

FIG. 3 illustrates an example collective attestation method 300 that may be performed to collectively attest some, most, or all of the SPDM-enabled devices 204 configured in an IHS 100 according to one embodiment of the present disclosure. Additionally or alternatively, the collective attestation method 300 may be performed at least in part, by the collective attestation system 200 as described herein above with reference to FIG. 2. The collective attestation method 300 may be performed at any suitable time, such as when the IHS 100 is re-booted, at ongoing intervals (e.g., periodically), whenever the integrity of the IHS 100 is questioned, or following a firmware update to one or more SPDM-enabled devices 204 in the IHS 100.

The method 300 may be performed with all of the SPDM-enabled devices 204 configured in the IHS 100. In other embodiments, the method 300 may be performed with only a subset of all available SPDM-enabled devices 204 configured in the IHS 100. For example, the IHS 100 may be configured with a multi-function Field Replaceable Unit (FRU), such as a PCIe or Compute Express Link (CXL) FRUs that is composed of multiple devices and functions. For example, a PCIe adapter may be composed of multiple, individual M.2 NVMe SSD FRUs. In this example, each individual M.2 module would need its own certificate in order to be authenticated using SPDM. In some embodiments, it may be beneficial to perform collective attestation over the sub-components of the multi-function FRU independently of when the other SPDM-enabled devices 204 in the IHS 100 are attested. For example, if the multi-function FRU comprises a storage device housing multiple, individual storage units that conform to a compliance specification, such as those required by the payment card industry (PCI) or the Health Insurance Portability and Accountability Act (HIPPA) that typically places certain constraints on the configuration of each storage node on which data may be stored, it would be beneficial to vouch for the security at times different from when the other storage units in the IHS 100 are vouched for. As another example, certain secure communication protocols may require that certain the SPDM-enabled devices 204 providing I/O ports for the IHS 100 be attested at different points of time while the communication protocol is being processed. Thus, the collective attestation method 300 may be performed over certain selected SPDM-enabled devices 204 so that the communication protocol may be processed in an efficient manner.

Initially at step 302, the collective attestation method 300 receives an attestation request from a requesting device. For example, the requesting device may be a console 202, such as a systems management appliance such as the Dell EMC OpenManage Enterprise (OME) systems manager. In one embodiment, the collective attestation method 300 may restrict attestation requests to only collective attestation. For example, if the collective attestation method 300 receives an attestation request for a single SPDM-enabled device 204, it may reject the request, and send an error message back to the console 202 indicating that the IHS 100 only accepts requests for collective attestation of the entire IHS 100. In another embodiment, the collective attestation method 300 stores information about a group of SPDM-enabled devices (e.g., subset of all SPDM-enabled devices in IHS 100) that are required to be attested collectively such that when an attestation request is received, it may perform collective attestation over each SPDM-enabled device 204 in the group.

At step 304, the method 300 attests each SPDM-enabled device 204 to verify its authenticity. For example, the BMC 132, acting as the requester, may challenge each SPDM-enabled device 204, and receive a challenge response from each SPDM-enabled device 204 to validate the authenticity of its respective SPDM-enabled device 204. Thereafter at step 306, the collective attestation method 300 communicates with each of the SPDM-enabled devices 204 to receive a device identity certificate 212 from each of the SPDM-enabled devices 204. In one embodiment, the collective attestation method 300 may receive firmware measurements from each of the SPDM-enabled devices 204 so that the integrity of the firmware of each of the SPDM-enabled devices 204 may be attested along with their hardware. Thereafter at step 308, the collective attestation method 300 performs a cryptographic hash over all of the device identity certificates 212 and/or firmware measurements collectively. In one embodiment, the collective attestation method 300 may perform measurement of the BMC firmware 210 and add to the cryptographic hash. In another embodiment, the collective attestation method 300 may obtain a device identity certificate 212 associated with the BMC 132, and add it to the cryptographic hash.

At step 310, the collective attestation method 300 sends the cryptographic hash to the requesting device in response to the request. The requesting device then at step 312 obtains the golden thumbprint 214 associated with the IHS 100 and compares it against the cryptographic hash obtained from the BMC 132. At step 314, If the golden thumbprint 214 and the received cryptographic hash match, the process ends at step 316. That is, processing continues in which the BMC 132 and its associated IHS 100 are allowed to operate in a normal manner with no further action taken. If, however, the match between the golden thumbprint 214 and cryptographic hash is unsuccessful, processing continues at step 318 in which the requesting device (e.g., console 202) generates an alert message that the attestation failed. For example, the requesting device may generate an alert message (e.g., pop-up window on a monitor screen) to the requesting device indicating the nature of the failure. In one embodiment, the collective attestation method 300 may restrict the IHS 100 to operation in a failsafe (e.g., limited) mode of operation when the attestation fails. The aforedescribed method 300 may be repeatedly performed for ongoing verification of the collective authenticity of the IHS 100. Nevertheless, when use of the collective attestation method 300 is no longer needed or desired, the method 300 ends.

In one embodiment, the collective attestation system 200 may also be used to perform SCV verification. As mentioned previously, SCV certificates contain identities of individual components which are not cryptographically bound to the hardware. If a hardware component is replaced by a counterfeit component, SCV verification is not able to identify the counterfeit component, a condition that may expose vulnerabilities. SPDM, however, provides a mechanism to identify the hardware component with a cryptographic identity. According to one embodiment, the collective attestation system 200 may bind the hardware component to a cryptographically verifiable identity of the SPDM-enabled device 204. With SPDM identities for individual hardware components, SCV certificates may include cryptographic identities of the SPDM-enabled devices 204, which can be challenged and verified for authenticity.

FIG. 4 illustrates an example SCV verification method 400 that may perform an SCV verification in which the SCV certificate is populated with SPDM certificates according to one embodiment of the present disclosure. Additionally or alternatively, the SCV verification method 400 may be performed at least in part, by the collective verification system 200 as described herein above with reference to FIG. 2. The SCV verification method 400 may be performed at any suitable time, such as when the IHS 100 is re-booted, at ongoing intervals (e.g., periodically), whenever the integrity of the IHS 100 is questioned, or following a firmware update to one or more SPDM-enabled devices 204 in the IHS 100.

Initially at step 402, the SCV verification method 400 receives a SCV verification request from a requesting device, such as a console 202. Thereafter at step 404, the method 400 attests each SPDM-enabled device 204 to verify its authenticity. In one embodiment, the BMC 132, acting as the requester, may challenge each SPDM-enabled device 204 for the proof of possession of private key, and each challenge response shall be used by the BMC 132 to validate the authenticity of its respective SPDM-enabled device 204. For example, the collective attestation system 200, functioning as a SCV Populator in the BMC 132, may use cryptographic identities (e.g., SPDM device identity certificates 212) of the SPDM-enabled devices 204 rather than non-cryptographic identities such as serial number and service tag etc. of individual hardware components as done conventionally. For devices that are not SPDM-enabled, the BMC 132 may still manage to use the same serial number and service tag as done conventionally for SCV verification.

Thereafter at step 406, the SCV verification method 400 communicates with each of the SPDM-enabled devices 204 to receive a device identity certificate 212 from each of the SPDM-enabled devices 204. Thereafter at step 408, the SCV verification method 400 populates a SCV-based manifest with the received SPDM-based device identity certificates.

At step 410, the SCV verification method 400 sends the populated manifest to the requesting device in response to the request. The requesting device then at step 412 obtains the golden thumbprint 214 (e.g., SCV certificate) associated with the IHS 100 and compares it against the manifest obtained from the BMC 132. At step 414, If the golden thumbprint 214 and the received manifest match, processing continues at step 416 in which the BMC 132 and its associated IHS 100 are allowed to operate in a normal manner with no further action taken. If, however, the match between the golden thumbprint 214 and manifest is unsuccessful, processing continues at step 418 in which the requesting device (e.g., console 202) generates an alert message that the SCV verification failed. For example, the requesting device may generate an alert message (e.g., pop-up window on a monitor screen) to the requesting device indicating the nature of the failure. In one embodiment, the SCV verification method 400 may restrict the IHS 100 to operation in a failsafe (e.g., limited) mode of operation when the SCV verification fails. The aforedescribed method 400 may be repeatedly performed for ongoing verification of the collective authenticity of the IHS 100. Nevertheless, when use of the SCV verification method 400 is no longer needed or desired, the method 400 ends.

Although FIGS. 3 and 4 describe example methods 300 and 400 that may be performed to ensure the collective integrity of an IHS 100, the features of the methods 300 and 400 may be embodied in other specific forms without deviating from the spirit and scope of the present disclosure. For example, either of the methods 300 and 400 may perform additional, fewer, or different operations than those described in the present examples. For another example, either of the methods 300 and 400 may be performed in a sequence of steps different from that described above. As yet another example, certain steps of either of the methods 300 and 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of Security Protocol and Data Model (SPDM)-enabled devices conforming to a SPDM specification; and
at least one memory coupled to at least one processor, the at least one memory having program instructions stored thereon that, upon execution by the at least one processor, cause the instructions to:
receive an attestation request from a requesting device;
receive a device identity certificate from each of the devices;
perform a firmware measurement of each of the devices;
perform a single cryptographic hash over the firmware measurements and the received device identity certificates to generate a single measurement; and
send the single measurement to the requesting device in response to the request.

2. The IHS of claim 1, wherein the program instructions are performed by a Baseboard Management Controller (BMC) configured in the IHS.

3. The IHS of claim 2, wherein the program instructions, upon execution, further cause the IHS to:
perform a BMC firmware measurement of the BMC; and
add the BMC firmware measurement to the cryptographic hash to generate the single measurement.

4. The IHS of claim 2, wherein the program instructions, upon execution, further cause the IHS to:

obtain a BMC device identity certificate associated with the BMC; and add the BMC device identity certificate to the cryptographic hash to generate the single measurement.

5. The IHS of claim 1, wherein the program instructions, upon execution, further cause the IHS to:

receive a device identity certificate from a portion of the SPDM-enabled devices configured in the IHS; and perform a cryptographic hash over the portion of received device identity certificates to generate the single measurement.

6. The IHS of claim 1, wherein the program instructions, upon execution, further cause the IHS to reject the attestation request when the attestation request is directed to a subset of the SPDM-enabled devices.

7. The IHS of claim 1, wherein the requesting device is configured to compare the single measurement against a golden thumbprint, and generate an alert message when the cryptographic hash does not match the golden thumbprint.

8. The IHS of claim 1, wherein the program instructions, upon execution, cause the IHS to populate a Secure Component Verification (SCV)-based manifest with the received device identity certificates; and send the populated SCV-based manifest to the requesting device in response to the request, wherein the requester is configured to compare the SCV-based manifest with a SCV certificate, and validate the SCV-based manifest based upon the comparison.

9. A collective attestation method comprising:

receiving an attestation request from a requesting device;

receiving a device identity certificate from each of a plurality of Security Protocol and Data Model (SPDM)-enabled devices conforming to a SPDM specification;

perform a firmware measurement of each of the devices;

performing a single cryptographic hash over the firmware measurements and the received device identity certificates to generate a single measurement; and sending the single measurement to the requesting device in response to the request.

10. The collective attestation method of claim 9, further comprising:

performing a BMC firmware measurement of a Baseboard Management Controller (BMC) configured in an Information Handling System (IHS); and adding the BMC firmware measurement to generate the single measurement.

11. The collective attestation method of claim 10, further comprising:

obtaining a BMC device identity certificate associated with the BMC; and adding the BMC device identity certificate to the single measurement.

12. The collective attestation method of claim 9, further comprising:

receiving a device identity certificate from a portion of the SPDM-enabled devices configured in the IHS; and performing a cryptographic hash over the portion of received device identity certificates to generate the single measurement.

13. The collective attestation method of claim 9, further comprising rejecting the attestation request when the attestation request is directed to a subset of the SPDM-enabled devices.

14. The collective attestation method of claim 9, further comprising comparing, by the requesting device, the single measurement against a golden thumbprint, and generating, by the requesting device, an alert message when the cryptographic hash does not match the golden thumbprint.

15. A computer program product comprising a non-transitory computer readable storage medium having program instructions stored thereon that, upon execution by an Information Handling System (IHS), cause the IHS to:

receive an attestation request from a requesting device;

receive a device identity certificate from each of a plurality of Security Protocol and Data Model (SPDM)-enabled devices conforming to a SPDM specification;

perform a firmware measurement of each of the devices;

perform a single cryptographic hash over the firmware measurements and the received device identity certificates to generate a single measurement; and send the single measurement to the requesting device in response to the request.

16. The computer program product of claim 15, wherein the program instructions, upon execution, further cause the IHS to:

perform a BMC firmware measurement of a Baseboard Management Controller (BMC) configured in an Information Handling System (IHS); and add the BMC firmware measurement to the cryptographic hash to generate the single measurement.

17. The computer program product of claim 15, wherein the program instructions, upon execution, cause the IHS to populate a Secure Component Verification (SCV)-based manifest with the received device identity certificates; and send the populated SCV-based manifest to the requesting device in response to the request, wherein the requester is configured to compare the SCV-based manifest with a SCV certificate, and validate the SCV-based manifest based upon the comparison.

* * * * *